Aug. 15, 1950   C. G. MUENCH   2,518,806
APPARATUS AND METHOD OF MANUFACTURING BOARDS
Filed Oct. 20, 1943   2 Sheets-Sheet 1
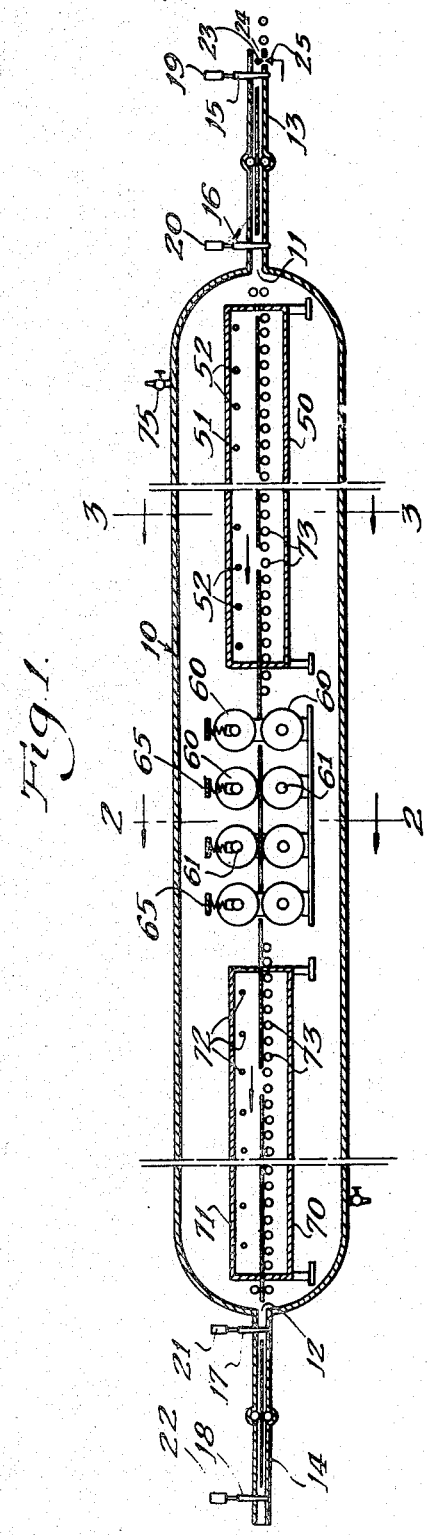
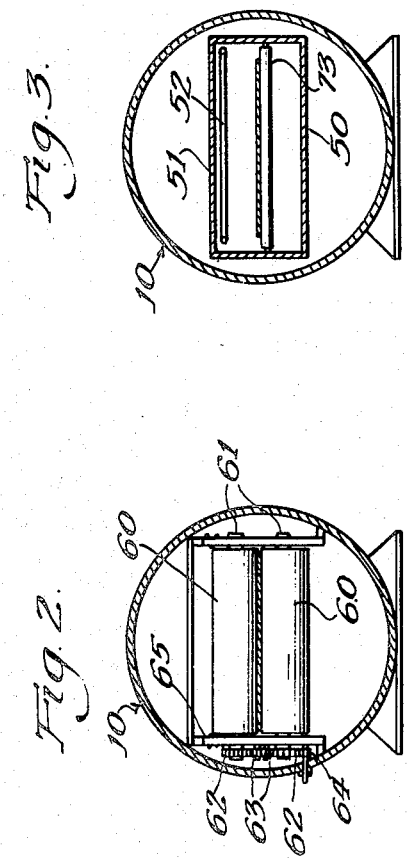
Inventor:
Carl G. Muench
By: Edw. A. Hampson
Attorney Aug. 15, 1950      C. G. MUENCH      2,518,806
APPARATUS AND METHOD OF MANUFACTURING BOARDS
Filed Oct. 20, 1943      2 Sheets-Sheet 2
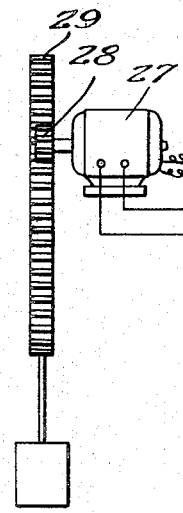
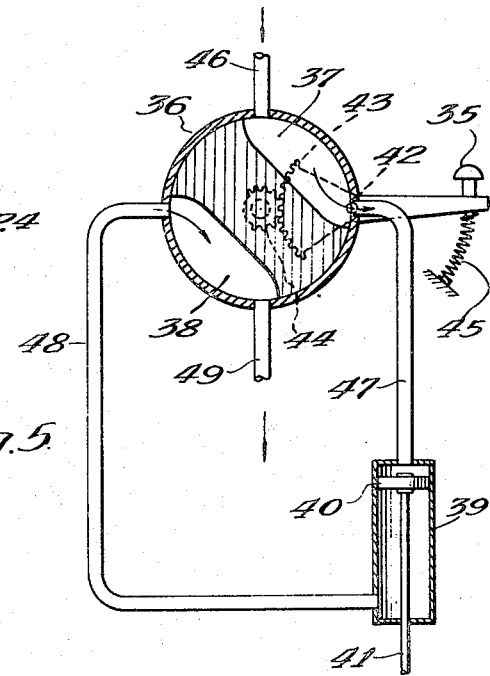
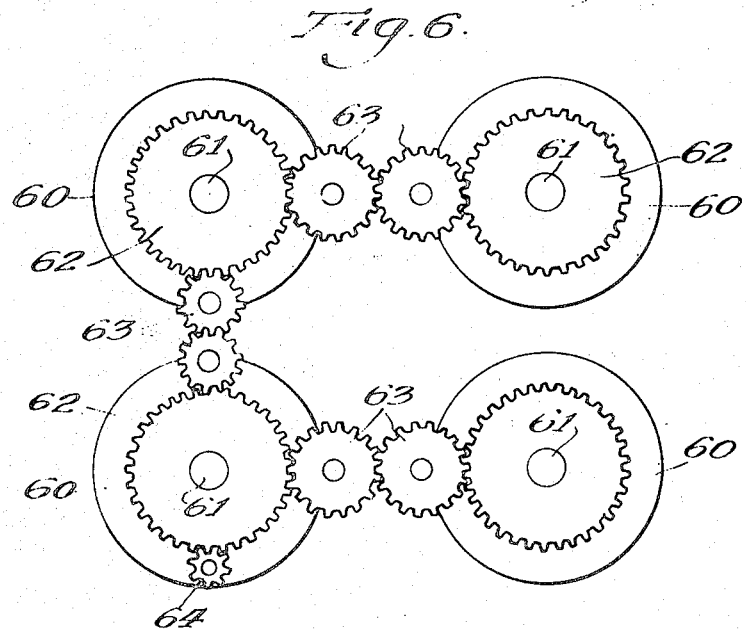
Inventor:
Carl G. Muench
By Edw. A. Hampson
Attorney Patented Aug. 15, 1950

2,518,806

UNITED STATES PATENT OFFICE 2,518,806

APPARATUS AND METHOD OF MANUFACTURING BOARD

Carl G. Muench, Glenview, Ill., assignor to The Celotex Corporation, Chicago, Ill., a corporation of Delaware Application October 20, 1943, Serial No. 506,976

7 Claims. (Cl. 92—39)

In the past it has been the practice in manufacturing products of the so-called hard board type to utilize for such manufacture the so-called hard board press which in practice has been a big hydraulic press having platens about 4 feet by 12 feet in size and provided with approximately 20 platen openings. The manufacture of hard board in a press of the character just mentioned is a rather unsatisfactory manufacturing operation. It is necessary to heat the platens with rather high pressure steam in the region of 150 to 300 lbs. pressure per sq. in., which necessitates the use of flexible or slip connections and it, of course, follows that the operation must be an intermittent or batch operation. Such features involved in the manufacture of hard board products are certainly not at all satisfactory from the production standpoint.

According to the inventions hereof the use of the big, multiple opening platen press is avoided in the process of the manufacture of hard board products and the former batch processing is converted into a continuous process of manufacture and the apparatus utilized, that is, in the final or pressing stage of the manufacture, comprises an elongated pressure cylinder with a heating conveying section, a press section and a cooling conveying section, there being provided at each end of the elongated pressure cylinder suitable passageways for the induction of and removal of the sheets being processed and which passageways are controlled by suitable valve mechanism to maintain pressure within the elongated pressure cylinder.

The principal object of this invention is the provision of a new and improved apparatus for the manufacture of hard products.

A still further object of the invention hereof is the provision of a new and improved apparatus for the manufacture of hard board wherein the material being processed is subject to an elevated pressure during the processing, and still further it is an object of the invention to provide a new and improved method for the manufacture of hard board products.

In the drawings accompanying this specification,

Figure 1 is a diagrammatic side elevation, in section, showing the apparatus for the manufacture of hard board products;

Figure 2 is a section taken on line 2—2 of Figure 1;

Figure 3 is a section taken on line 3—3 of Figure 1;

Figure 4 is a diagrammatic view illustrating a detail of the control mechanism;

Figure 5 is a further diagrammatic showing of an alternative control mechanism; and Figure 6 is a diagrammatic illustration of the drive for the press roll section of the apparatus.

The basic feature of the apparatus for the manufacture of hard board from preformed sheet, fibrous stock is an elongated cylinder built to withstand relatively high internal pressures. Due to the fact that the elongated cylinder is a pressure vessel it is preferable that such be cylindrical although this particular feature has nothing in particular to do with the manufacturing process as such. The cylindrical form of the elongated pressure cylinder is dictated by the fact that there is carried within the cylinder an internal presure of from about 150 lbs. per sq. in., which pressure may on the other hand be 300 lbs. per sq. in., or even higher, and in fact, if the elongated cylinder is built to withstand such internal pressure, it is probable that the internal pressure carried within the cylinder may be raised to as high as 500 or 600 lbs. per sq. in.

The elongated cylinder above referred to is one which will probably be about 70 feet long up to as much as 90 or 100 feet in length. The cylinder is about 8 feet in diameter although this depends somewhat on the width of the board which is to be produced therein, but however, a diameter of about 8 feet is required for the manufacture of hard board products of the customary width of 4 feet.

The elongated pressure cylinder is provided at each of its ends with a narrow and elongated port, which at one end is an entrance or admission port and at the other end is an exist port. The entrance and exit ports are positioned in approximately the middle of the ends of the pressure cylinder and they extend horizontally.

The various parts of the apparatus which have up to now been referred to are the elongated pressure cylinder identified by the numeral 10, the entrance port 11 and the exit port 12.

At each, the entrance and exit ports 11 and 12 there is appropriately secured to the end of the pressure cylinder 10 sealing charging and discharging locks or entrance and exit locks designated by numerals 13 and 14 respectively.

Each the entrance and the outlet lock is provided with suitable cutoff valves or gates which although such may be of identical construction are each given a separate numeral for the purpose of identification, being identified by numerals 15, 16, for the entrance gates and 17, 18 for the exit gates.

These gates provided in the entrance and exit locks are synchronized with suitable conveyor feeds to and from the pressure cylinder so that the sheets of material passing into the pressure cylinder to be operated upon and those which have been operated upon and which issue from the pressure cylinder are admitted and removed with the minimum loss of pressure from the pressure cylinder. Each of the valves or gates 15 to 18 is provided with suitable actuating mechanism adapted for quick opening and closing of its respective gate and in connection with each of the such gates and its operating mechanism there is provided control mechanism which activates its respective gate operating mechanism. In the drawing there is shown diagrammatically gate operating means designated for gate 15 by the numeral 19, for the gate 16 by the numeral 20, for gate 17 by numeral 21 and for gate 18 by numeral 22, which gate operating means in each case is suitably activated and controlled by connecting control means in which the ultimate control means is a suitable push button or the like positioned in the path of the material which is moving into and out of the pressure chamber.

The gate operating means are diagrammatically illustrated in two forms in Figures 4 and 5 of the drawing, wherein these figures illustrate the same principles of control but with Figure 4 illustrating an electrically operated control and gate operating means, whereas Figure 5 illustrates a hydraulic operating control and gate operating means. The operating control, referring to Figure 4 comprises a suitable electrical switch adapted to be placed in the path of sheets of material being fed into the pressure cylinder so as to result in proper timed operation of the charging or entrance cut-off valves or gates, and in the case of the exit cut-off valves or gates to be suitably placed with respect thereto to be actuated by the finished sheet of material issuing from the pressure chamber.

The electric switch for actuating the gate opening means is indicated generally by the numeral 23 and it comprises electrical contacts, one of which 24 is movable and the other 25 is stationary. These electrical switches are placed respectively, one in the path of the sheets being fed to the pressure cylinder, to be contacted thereby as such sheet aproaches gate 15, and a second one also in the path of the sheet being fed to the pressure cylinder to be contacted thereby as such sheet approaches gate 16. Associated with and controlled by the just referred to switches 23 there are associated relays 26 which also incorporate time limit and reversing elements which relays 26 in turn control operating motors 27, which through suitable pinions or the like 28 operate racks 29 provided on gate members 15 and 16. It is to be understood that pinions and racks 28 and 29 are merely representative of mechanism for operating the gates and that there may be used instead suitable cam mechanism, crank mechanism or the like as is well understood by those skilled in the art involved.

The combination relay, time limit and reverse switch 26 has not been illustrated in detail, merely being shown diagrammatically since the features of such units are well known to those skilled in the art and the exact interior construction thereof depends upon the specific function to be accomplished. Generally speaking the relay 26 comprises a relay which makes and breaks the electric circuit for motor 27, which relay serves when switch 23 is closed to connect the source o electrical energy to motor 27 to cause the motor to operate and through pinion 28 to drive rack 29 upwardly and consequently open gate valve 15. By a time limit switch associated with this phase of the operation of the relay, the relay is caused to open and break the electric circuit for the motor when the gate 15 has been opened sufficiently to allow a sheet of board to pass through the gate into lock 13 to be fed into the pressure cylinder 10. As the sheet being fed toward the pressure cylinder clears switch 23 associated with gate 15 the switch contact is broken which causes relay 26 to energize the motor circuit through a reversing switch, whereby motor 27 is driven in a reverse direction to cause gate 15 to close.

At about the same time that the circuit of the motor controlling gate 15 is reversed the forward end of the sheet being fed to the pressure cylinder contacts the second switch element 23 which is adjacent gate 16. As the sheet contacts the second switch 23 the switch is closed and through a relay connected in the circuit of the motor which operates gate 16 the sequence of events as above described with respect to the operation of gate 15 is carried out with respect to gate 16, whereby the gate 16 is opened. The sheet then passes through into the pressure cylinder and as the sheet clears the switch, the switch is opened, to through the relay reverse switch cause the gate 16 to close to prevent loss of pressure from the pressure cylinder.

The gates 15 and 16 may alternatively be operated hydraulically as is diagrammatically illustrated in Figure 5 of the drawing. For operation of the gates 15 and 16 hydraulically there is provided in the path of the sheets being fed to the pressure cylinder an activating or contact member 35 which is contacted by the forward edge of the sheet as it aproaches gate 15 and which upon being depressed by the forward edge of the sheet causes the actuation of a valve in a hydraulic system controlling gate 15. The hydraulic system involves a rotary valve 36 which has a valve core having cut-outs 37 and 38 together with suitable piping connections for a pressure fluid supply and for connecting such supply through the valve to a pressure cylinder 39 in which there operates a piston 40 connected to a piston rod 41 which serves to actuate a gate such as 15 of the entrance lock to the pressure cylinder. The actuating or contact member 35 is shown as pivoted between its ends at a point 42 and as provided with an arcuate rack member 43 which serves to drive an arcuate rack member 44 which oscillates the valve core about its axis as the actuating member is depressed or is returned to its normal elevated position due to the effect of a spring 45 positioned under the outer end of the actuating member.

With respect to the above hydraulic operating mechanism it is readily apparent that as shown with actuator 35 in elevated position, pressure fluid from pipe 46 is connected through valve core passage 37 and pipe 47 to the upper end of the pressure cylinder 39, thus driving piston 40 downwardly and through piston rod 41 actuating a gate valve downwardly to close the gate to which it is connected. As the actuating member 35 may be depressed, as by the forward edge of a board approaching a gate 15 the valve core is rotated through approximately 180° by the co-operating arcuate rack members 43 and 44 and the pressure fluid connections are reversed so that pipe 46 is connected through valve core passage 37 to pipe 48 which supplies pressure fluid to the lower end of pressure cylinder 39 under piston 40 to cause the piston to be driven upwardly and thus through piston rod 41 to elevate and open a gate 15 to which it may be connected. Of course, in connection with the operation of the hydraulic system it is obvious that as one end of the pressure cylinder is connected to the pressure source through the valve, that the other end of the pressure cylinder is at the same time open to exhaust 49, and that as the position of the actuating member is changed that the opposite end of the pressure cylinder is correspondingly open to exhaust so that the pressure applied to the other end of the cylinder may actuate the piston to suitably actuate the gate to which the piston is connected.

The gate actuating means, both the electrical and hydraulic, as above described are, it is to be understood, merely specific forms of controls which may be utilized but it will be readily apparent to one skilled in the art that these controls are merely illustrative and that one skilled in the art if given the cycle which is to be accomplished may readily provide suitable control which may be those as described, or which may differ therefrom, as for example, when an electrical control is utilized the second switch element 23 may be connected through a suitable relay to reverse the motor of the gate 15, in which case the relay to which the first electrical switch, that is the one just ahead of gate 15, would not be provided with a reversing element as the reversal of the first motor to close gate 15 would be controlled from the second switch member. Also switch members might be provided just ahead of and just behind each of the gate valves which switch member would be connected through suitable relays or the like to cause the forward and reverse operations of the respective motors, and in which case there would be no necessity for a delayed action element in the circuit to prevent the gate from closing down on the rear end of the sheet before it had passed from under the gate. Also, speed limit switches may be provided which are actuated from the racks 29 which operate the gates and in which case there would be no need for time limit switches in the relay units 26. Actuating mechanism and controls are of course associated with the exit lock 14. Such mechanism and controls are the same as those described in connection with charging lock 13.

Inside the pressure cylinder 10 there are provided sections which may be termed a heating section, a pressing section and a cooling section. The heating section inside the pressure cylinder is illustrated as a relatively enclosed space within the pressure cylinder. The heating section is substantially closed off from the remainder of the cylinder by means of partition or insulating members 50 and 51, which might be described as suitably mounted and opposite long shallow boxes having their open faces facing one another. Within the heating section there are provided heating means which are merely illustrated as small circles 52, which may represent any suitable heating means, as for example, may represent electric heaters, steam heating coils, radiant lamps or the like. The two partition or insulating members 50 and 51 are of course slightly spaced so that a sheet being fed through the apparatus may pass between these two elements and there is provided within the construction suitable conveying means for conveying a sheet of material therethrough and which conveying means are illustrated merely as a series of conveyor rolls, the rotating mechanism for which, for the sake of clarity and simplicity of the drawings is not shown, but which is so well known that it is considered that no specific disclosure thereof is necessary to acquaint one with the mechanism required. Each conveyor roll would merely have a suitable sprocket wheel or the like on its shaft and a drive chain may drive the entire series of rolls, or alternatively, one or several of the conveyor rolls may be suitably driven and the remainder of the rolls may be driven therefrom by contacting friction elements mounted on the respective shafts.

Substantially centrally of the pressure cylinder 10 there is provided a pressing section, which section as shown, is made up of a hot pressing section and a cold pressing section. The hot pressing section of the press is illustrated as comprising two sets of two rolls each, each of which rolls is designated by numerals 60. These rolls are preferably three feet in diameter, and of course, are slightly in excess of the width of the board being pressed, which, in the particular example being described, being approximately a four foot board will require pressure rolls of a length of five feet, more or less. Each press roll is mounted on hollow trunnions or shaft 61, which by suitable piping connections may serve to carry a heating fluid to and from each of the rolls so that the heated rolls may serve as a hot press section of the apparatus. On each trunion at one side there may be mounted suitable driving means, such as gears 62, by which the press rolls 60 may be rotated. The intermediate gears 63 may be rotated between gears 62 so that the entire hot press section may be driven by pinion 64 on the shaft of a suitable motor or other prime mover all of which construction is diagrammatically shown in Figure 6 of the drawing.

It will, of course, be understood that the press rolls just above described are mounted in suitable frames which carry bearings in which the trunnion 61 of the rolls are mounted and with the bearings of the upper rolls of the set mounted in suitable guideways so that spring pressure may be exerted thereupon by springs 65 which press the upper rolls down against the lower rolls of their respective sets to provide the required application of pressure on a sheet of material while it is being passed through the hot roll section.

Immediately following the hot roll section just described there is a similar cold roll section which is similarly constructed and arranged, but through which rolls there is circulated a cooling fluid instead of a heating fluid. Concerning the heating and cooling of the rolls of the hot press section and the rolls of the cold press section it is, of course, to be understood that these sections are respectively heated and cooled by the circulation of any appropriate medium as is well understood. For the hot press section the circulating medium may be steam or it may be high pressure hot water or any other suitable heating fluid, whereas for the cold press section the circulating medium may be a cold expanded gas, as a refrigerant, or it may be cold water or brine or the like, as is well understood by those skilled in the art to which this invention appertains. The cold press section may be driven from the hot press section by intermediate positioned gears such as are used between the various rolls of the hot press section.

Following the cold press section there is provided a cooling section which is similar to the heating section of the apparatus and in which the partition or insulating members thereof are designated as 70 and 71, corresponding to members 50 and 51 of the heating section of the apparatus. Provided within partition member 71 there are indicated small circles 72 which represent cooling coils or the like through which a cooling medium may be circulated for cooling the atmosphere within the partition or insulating construction so that boards passing therethrough will be cooled.

Positioned within the cooling sections of the apparatus there is provided supporting and conveying mechanisms for conveying sheets therethrough, which conveying mechanism is illustrated as comprising a plurality of conveyor rolls 73 which conveyor rolls as is well understood are either driven one from another by suitable friction elements or gears with interposed idlers, or are driven by a chain running over suitable sprockets mounted thereon, and in any case suitably connected to power means for causing the rotation of the conveyor rolls.

In the apparatus thus far described there is provided a new and improved means for the manufacture of which is generally termed hard board or hard pressed board, which is manufactured from cellulose containing fiber, but it will be readily apparent that the apparatus may be utilized for the manufacture of any type of board form product which requires the sequence of conditions and operations which may be obtained by the utilization of the described apparatus. The apparatus described will receive a board form sheet through its entrance lock, which sheet after passing through the lock enters into the heating section of the pressure cylinder. As the sheet is conveyed to the heating section it is heated up depending upon the amount of heating required and the sheet then passes to and through the hot roll pressing section where the sheet is hot pressed. Immediately after the sheet passes through the hot pressing section it passes into the cold pressing section where the sheet is cooled down somewhat under pressure by the cool pressing rolls and then the somewhat cooled pressed sheet passes into the cooling section where it is cooled down further to about 200° F. or lower, and finally the cooled sheet is discharged through the exit lock. It is, of course, understood that during the entire time that the sheet is being processed within the pressure cylinder it is or may be subjected to the fluid pressure which is maintained within the pressure cylinder.

As a specific illustration for the manufacture of a hard pressed fiber board made from a ligno-cellulose fiber, the process is as follows:

A sheet of ligno-cellulose fiber board, felted from a suspension of fiber in water, which may be formed particularly for the purposes hereof, or which may conveniently be a pre-fabricated sheet of commercial fiber insulation board, which is available on the market under different brand names and which is composed principally of felted ligno-cellulose fiber and which may be waterproofed with rosin and alum or paraffin or other usual waterproofing agents and which may or may not contain a small content of added binder material, as for example, several per cent of tung oil or a small amount of phenol formaldehyde resin or the like say, about 2% to 12%, or more, depending on the binder used and results desired, is fed to the pressure cylinder through the entrance pressure lock. The sheet would ordinarily contain something like 5 to 9% moisture content but may contain from about 2% to as high as about 10%, or even slightly more moisture content.

In the manufacture of the particular product being described the pressure within the pressure cylinder is preferably maintained by steam at such pressure that a temperature of from about 250 to 400° F. is maintained within the pressure cylinder, which will require a steam pressure of about 225 lbs. to 250 lbs. per sq. in. to achieve the usual temperature of about 400° F. It is to be understood that the temperature of 400° F. is not the upper limit since preferably the temperature would be carried somewhat higher, which in general will produce a somewhat better finished product, the ideal temperature at which the pressure cylinder should be carried being about 450° or slightly higher, up to about 500° F. as the upper limit. The range of temperatures referred to are provided by steam within the range of about 200 to 800 lbs. per sq. in. To obtain temperature such as has just been mentioned in the pressure cylinder would however require such high steam pressure that it would require exceedingly massive and heavy construction of the pressure cylinder to withstand such internal pressure if saturated steam is to be used as the heating medium. It is however possible that by using superheated steam the desired higher temperatures can be obtained and maintained without necessitating these excessive internal pressures within the pressure cylinder, and therefore such utilization of my inventions involving the use of superheated steam for obtaining higher temperatures is within the contemplations of the invention. It is the particular purpose of the maintenance of pressure within the pressure cylinder to prevent moisture being boiled off from the sheet being processed, and therefore it is preferable that the pressure within the pressure cylinder be provided by steam of suitable pressure as has been mentioned, circulating through the pressure cylinder.

The sheet of ligno-cellulose which is fed into the pressure cylinder through the entrance lock passes into the heating section of the apparatus in which due to the heating elements contained therein is preferably raised to a temperature of from 250° to 500° F. with the preferred range of heating being around 400°, or that temperature at which the natural gums and resins of the sheet are softened. Incidentally, the sheet of ligno-cellulose as it is fed into the apparatus normally has a small moisture content which under normal conditions and depending somewhat upon atmospheric humidity will ordinarily be around 8 per cent. In commercial production it is impossible, or at least virtually impossible to have the sheets of ligno-cellulose bone dry, and in any case in commercial production it is a substantial certainty that the sheets as they are fed to the apparatus will contain at least about 2 per cent moisture content.

The ligno-cellulose sheets after they have been brought up to a temperature of about 400° in the heating section of the apparatus are conveyed to the hot press rolls where they are hot pressed by the action of the several pairs of heated press rolls. The press rolls are preferably heated to a temperature of between 400° and 500° F. and have such pressure applied thereto that there is applied on a sheet being pressed a pressure between the limits of approximately 500 pounds to 1000 pounds per lineal inch across the width of the press rolls. The application of the heat and pressure to the ligno-cellulose sheet between the heated press rolls serves to compress the hot sheet in which the gums and resins have been softened and the temperature of the press rolls causes a drying out of the sheets. The sheets are densely compacted between the rolls and there is, due to the conditions existing, apparently a chemical action or reaction of some of the constituents of the sheet being pressed, which causes the fibers thereof to be bonded one to another.

The hot pressed sheet from the hot press section of the apparatus passes directly into the cool press section where the sheet is cooled between the pressure rolls thereof but while subjected to approximately the same press pressure as existed in the hot pressed section. The cooling down of the sheet in the cool press section apparently causes the previously softened resins and gums to harden while the fibers of the sheet are maintained in a densely compacted relation, so that as the sheets are discharged from the cool press section they are hard and dense and firmly bonded. From the cool press section of the apparatus the sheets are then conveyed to the cooling section where, as is clearly apparent, they are further cooled down and then the cooled sheets are discharged through the discharge lock of the apparatus.

In the procedure of the hot pressing of the ligno-cellulose sheet there are apparently several things which may occur, if added binder was present in the sheet, it may be set if it is a setting binder, or it may be polymerized if it is a polymerizing binder such as phenol formaldehyde, or it may be rendered soft and adhesive if it is a thermo-plastic type of binder. In the cooling press section there is little effect if the binder is a polymerizing binder, except that the sheet is somewhat cooled while held under heavy compacting pressure but if the sheet incorporates a thermo-plastic binder such binder is cooled down and set while the sheet is held under heavy compacting pressure. While it has not before been mentioned the sheet of ligno-cellulose which is being processed is conveyed through the apparatus at a suitable rate of speed, which in general has been found to be preferably a speed of approximately 20 feet per minute, although such speed of travel through the apparatus may be varied between any reasonable limits depending largely upon the binder which is utilized, including lignin of the ligno-cellulose as a binder. It will, of course, be understood that since the best results to be obtained will depend to a considerable degree upon the particular binder which is used that it will be necessary, for the determination of the best rate of travel through the apparatus, that some test sheets be run through to determine the particular speed at which they should be run through for the purpose of producing the most satisfactory product.

For maintaining pressure within pressure cylinder 10 suitable valved connections 75 are provided through which can be supplied a suitable gas or vapor for maintaining the desired pressure within the cylinder. The pressure within the cylinder may be provided by the introduction of a gas under pressure which may be either nitrogen, carbon dioxide or other suitable gas supplied under pressure. The internal cylinder pressure may alternatively be provided by supplying steam to the cylinder through valved connections 75. Particularly in case that steam is used for providing the internal cylinder pressure a suitable condensate return may be connected to the cylinder for removing such steam as condenses therein, but which condenser removal apparatus is not shown nor further described since this is conventional apparatus and actual showing thereof or further description would not add any to this disclosure.

In connection with the foregoing description the preferred form of the apparatus and process have been set out by way of example and various details relating thereto being well known to those skilled in the art have been omitted from such description for the sake of clarity. It is, of course, to be understood that various well known mechanical equivalents may be substituted for the various mechanical drives, specific mechanisms and the like specifically described, and it is to be understood that those specifically described are so described merely by way of example.

The particular operating conditions of the specific example which was given apply, it is to be understood, to a specific example for the manufacture of a particular product, but however, such is given merely by way of example and the cylinder pressure, heating and cooling temperatures and roll pressure may be suitably varied in accordance with a condition to which blanks are to be subjected for the production of the desired final product.

The preferred form of the apparatus having been discussed and described and a preferred method and conditions of operation having been set out in detail it is to be understood that it is not the intention that the inventions hereof shall be limited to the specific apparatus or process or conditions described, but that it is the intent that the inventions hereof shall be utilized by those skilled in the art as merely representative and directive with respect to my inventions. It is the intent that this disclosure shall extend to all variations thereof which will be apparent to one skilled in the arts involved in view of the disclosures specifically made and that the inventions shall be limited only as so limited in the appended claims.

What I claim is:

1. In a board processing apparatus, an elongated pressure retaining cylinder, entrance and exit locks, means therein for conveying board form material therethrough, therein a heating means adjacent one end and a cooling means adjacent the other end of the cylinder, pairs of heated and cooled rolls positioned between the heating and cooling means, and means for admitting fluid pressure to the pressure cylinder.

2. A board processing apparatus comprising an elongated pressure cylinder, entrance and exit locks at the respective ends of the cylinder, conveyor means for carrying sheet material into and through the ertnace lock, through the cylinder and out the exit lock, within the cylinder at the entrance end thereof an interior enclosure provided with ports in its ends and means for heating the interior thereof and at the exit end thereof an interior enclosure provided with ports in its ends and means for cooling the interior thereof, pairs of heating and cooling rolls positioned between the heated and cooled enclosures, and pressure fluid admission means for admitting pressure fluid to the pressure cylinder.

3. The process of manufacture of a structural board form product from ligno-cellulose fiber comprising the steps of forming a sheet of the fiber, passing such sheet into a high pressure atmosphere at a pressure of from about 150 to 600 lbs. per square inch, therein subjecting the sheet to heating, to hot pressing, cold pressing and to cooling serially and finally discharging the sheet from the high pressure atmosphere.

4. The process of manufacture of a structural board form product comprising cellulose fiber and comprising the steps of forming a fiber sheet, passing such sheet into a high pressure atmosphere of about 225 to 250 pounds per square inch, therein subjecting the sheet to heating to about 400 to 450° F., then to hot compression followed by cooling compression, then to a cooling atmosphere and finally discharging the sheet from the high pressure atmosphere to atmospheric pressure.

5. The process of manufacturing of a structural board from a cellulose containing fiber comprising the formation of a felted sheet of such fiber having a moisture content of over 2% but not over about 10%, the subjection thereof to a circumambient atmosphere at a pressure of between about 200 to 800 pounds per square inch and wherein it is heated to about 400° F. then hot compressed between heated rolls at a pressure of about 500 to 1000 pounds per lineal inch across the width of the heated rolls, is then cooled and discharged from the high pressure.

6. The process of continuous manufacture of a hard structural board from a ligno-cellulose containing fiber comprising the formation of a felted sheet of such fiber having a moisture content of over 2% but not over about 10% and having incorporated about between 2 to 12% of added binder material, the subjection thereof to a circumambient atmosphere at a pressure of between about 200 to 800 pounds per square inch and wherein it is heated to about 400° F. then hot compressed between heated rolls at a pressure of about 500 to 1000 pounds per lineal inch across the width of the heated rolls, is then cooled to a temperature not in excess of about 200° F. and discharged from the high pressure atmosphere.

7. The process of manufacture of a structural board form product from fiber and binder and comprising the steps of forming ligneous fiber and adhesive binder to sheet form, passing the formed sheet of fiber and binder into a surrounding atmosphere which is at a pressure of between about 150 to 800 pounds per square inch and therein, while the said sheet is subjected to the such high pressure atmosphere, is heated, then pressed and then cooled, and thereafter is discharged from the high pressure atmosphere.

CARL G. MUENCH.

REFERENCES CITED

The following references are of record in the file of this patent:

UNITED STATES PATENTS

| Number | Name | Date |
| --- | --- | --- |
| 179,414 | Kelly | July 4, 1876 |
| 1,796,264 | Grondal et al. | Mar. 10, 1931 |
| 1,862,688 | Loetscher | June 14, 1932 |
| 2,030,626 | Ellis | Feb. 11, 1936 |
| 2,036,466 | Ellis | Apr. 7, 1936 |
| 2,140,189 | Mason | Dec. 13, 1938 |
| 2,161,653 | Ellis | June 6, 1939 |
| 2,167,440 | Mason | July 25, 1939 |
| 2,208,511 | Ellis | July 16, 1940 |
| 2,309,206 | Newman | Jan. 26, 1943 |
| 2,323,339 | Mason | July 6, 1943 |